US012572011B2

(12) United States Patent
Lampaert et al.

(10) Patent No.: US 12,572,011 B2
(45) Date of Patent: Mar. 10, 2026

(54) OPTICAL SYSTEM WITH CROSS TRACK ERROR REDUCTION

(71) Applicant: CONFOCAL.NL B.V., Amsterdam (NL)

(72) Inventors: Stefan Georges Emile Lampaert, Vleuten (NL); Florian Frederik Sterl, Maarssen (NL); Bart Tromp, Rijswijk (NL)

(73) Assignee: CONFOCAL.NL B.V., Amsterdam (NL)

( * ) Notice: Subject to any disclaimer, the term of this patent is extended or adjusted under 35 U.S.C. 154(b) by 0 days.

(21) Appl. No.: 19/118,626

(22) PCT Filed: Oct. 4, 2023

(86) PCT No.: PCT/EP2023/077403
§ 371 (c)(1),
(2) Date: Apr. 4, 2025

(87) PCT Pub. No.: WO2024/074536
PCT Pub. Date: Apr. 11, 2024

(65) Prior Publication Data
US 2025/0264716 A1      Aug. 21, 2025

(30) Foreign Application Priority Data

Oct. 5, 2022    (NL) ...................................... 2033242

(51) Int. Cl.
*G02B 26/12* (2006.01)
*G02B 21/00* (2006.01)

(52) U.S. Cl.
CPC ......... *G02B 26/12* (2013.01); *G02B 21/0048* (2013.01)

(58) Field of Classification Search
CPC ...... G02B 26/12; G02B 21/0048; G02B 5/09; G02B 5/1814; G02B 7/1821;
(Continued)

(56) References Cited

U.S. PATENT DOCUMENTS 5,387,996 A * 2/1995 Palombo .............. G02B 26/129
250/236
5,614,961 A 3/1997 Gibeau et al.
(Continued)

FOREIGN PATENT DOCUMENTS

DE        4300739 A1   6/1994
DE   102005044842 A1   3/2006
(Continued)

OTHER PUBLICATIONS

De Luca et al. "Re-scan Confocal Microscopy: Scanning Twice for Better Resolution", Biomedical Optics Express, Oct. 25, 2013, pp. 2644-2656, vol. 4, No. 11.
(Continued)

*Primary Examiner* — Mustak Choudhury
(74) *Attorney, Agent, or Firm* — Steven M. Koehler; Westman, Champlin & Koehler, P.A.

(57) ABSTRACT

An optical system is provided which comprises a scanning mirror having a reflective facet, and a plurality of optical elements defining a light beam path from a first location to a second location via plural facet reflections on the facet comprising a relay segment from one facet reflection to a next facet reflection. A method is also provided comprising directing light from a light source along a light beam path from a first location to a second location via plural facet reflections on a rotary reflective facet of a scanning mirror, and relaying one facet reflection to a next facet reflection on the facet while rotating the facet.

22 Claims, 5 Drawing Sheets

(58) Field of Classification Search

CPC .............. G02B 26/121; G02B 17/0812; G02B 17/0808; G02B 5/0816; G02B 5/0891; G02B 17/006

See application file for complete search history.

(56) References Cited

U.S. PATENT DOCUMENTS

| | | | | |
|---|---|---|---|---|
| 5,715,021 | A | 2/1998 | Gibeau et al. | |
| 5,920,361 | A | 7/1999 | Gibeau et al. | |
| 7,312,920 | B2 | 12/2007 | Okugawa | |
| 9,041,991 | B2 * | 5/2015 | Borchers | H04N 9/3185 |
| | | | | 359/219.2 |
| 2006/0066944 | A1 * | 3/2006 | Okugawa | G02B 26/12 |
| | | | | 359/368 |
| 2019/0310468 | A1 * | 10/2019 | Sapir | G02B 26/123 |
| 2022/0397751 | A1 | 12/2022 | Manders | |

FOREIGN PATENT DOCUMENTS

| | | | |
|---|---|---|---|
| EP | 0465136 | A2 | 1/1992 |
| JP | 2003-322820 | A | 11/2003 |
| WO | 2020263094 | A1 | 12/2020 |

OTHER PUBLICATIONS

Gregor, I. and Enderlein J. "Image Scanning Microscopy", Current Opinion in Chemical Biology, Jun. 13, 2019, pp. 74-83, vol. 51, Current Biology Ltd, London, GB.

Li et al. "Dual Mode Reflectance and Fluorescence Confocal Laser Scanning Microscopy for In Vivo Imaging Melanoma Progression in Murine Skin", Journal of Investigative Dermatology, Oct. 1, 2005, pp. 798-804, vol. 125, No. 4.

Khattak, A. and Shimoji, M., "Refractive Scanner Removes Tracking Errors Economically", Laser Focus World, Mar. 1992, pp. 73-79, vol. 28.

Marshall, G. and Stutz, G., "Handbook of Optical and Laser Scanning" Second Edition, Optical Science and Engineering, 2011, 789 pages, CRC Press, University of Rochester, Rochester, NY, US.

Paudel et al. "In-vivo Flow Cytometry for Blood Cell Analysis Using Differential Epi-detection of Forward Scattered Light", Progress in Biomedical Optics and Imaging, SPIE—International Society for Optical Engineering, Feb. 20, 2018, vol. 10497, 4 pages, Bellingham, WA, US.

International Search Report and Written Opinion in corresponding International Application Serial No. PCT/EP2023/077403 dated Feb. 23, 2024.

Office Action in corresponding Chinese patent application serial No. 202380077771.8 dated Dec. 4, 2025.

* cited by examiner

OPTICAL SYSTEM WITH CROSS TRACK ERROR REDUCTION

CROSS-REFERENCE TO RELATED APPLICATION

This Application is a Section 371 National Stage Application of International Application No. PCT/EP2023/077403, filed Oct. 4, 2023 and published as WO 2024/074536 A1 on Apr. 11, 2024, in English.

TECHNICAL FIELD

The present disclosure relates to optical systems comprising a scanning mirror having a reflective facet, and a plurality of optical elements defining a light beam path from a first location to a second location. The scanning mirror may comprise rotary polygon mirror.

BACKGROUND

Scanning mirrors are widely known for scanning a light beam from a light source over a target area by reflecting a light beam on the reflective facet of a mirror, and rotating (also called "scanning" as well) the mirror head and thus the reflective facet. Rotary polygon mirrors, also known as polygon scanners, are high-speed scanners with a mirror head with multiple mirror facets attached to a shaft rotated about its center axis. The mirror head is attached to a shaft rotated about its center axis. The shaft may be mounted with suitable bearings, e.g. magnetic bearings, ball bearings and/or air bearings for higher speed applications. In a raster scanning application, the rotation of the mirror may define a fast axis and perpendicular to that a slow axis. The rotation of the facet results a scan line, and when using a polygon mirror every passing reflective polygon facet results in an individual (fast-axis) scan line. However, due to machining imperfections of the mirror head, and/or imperfections in the bearings, scanning mirrors tend cause a certain cross-scan error perpendicular to the fast-axis scanning direction defined by the rotation axis. For polygon mirrors the cross-scan error (or: "dynamic track error") may also, or in particular, be due to imperfections of the polygon facets. Depending on the application this error can form a problem if it is too high.

WO 2020/263094 discloses use of a polygon scanner for raster scanning for confocal microscopy. If in such case the dynamic track error is constant but not equal for each facet, each fast-axis scan line moves transverse to the scan line. This results in an unevenly illuminated raster scan pattern, which can result in perceivable brightness banding on the final image.

Several methods already exist to reduce dynamic track error for polygon mirrors. E.g.: G. Marshall and G. Stutz, Handbook of Optical and Laser Scanning, Second Edition, ser. Optical Science and Engineering. Taylor & Francis, 2011, which describes using a retro-reflective prism; EP 0 465 136 A2, which discloses using a cylindrical lens; and DE 4 300 739 A1, which discloses using active beam steering to correct for the (known) facet error with the use of e.g. acousto-optical beam steering or galvanometers. See also U.S. Pat. No. 5,614,961 and A. S. Khattak et al. "Refractive scanner removes tracking errors economically", Laser Focus World, 28(3), March 1992, p. 73-77, 79, ISSN: 1043-8092

However, these solutions either do not fully correct the error, require size increase of polygon facets, or require precise timing. For a polygon of a given size, increasing sizes of polygon facets may force a reduction of the number of facets Tighter tolerances on the machining of the polygon are also possible to reduce manufacturing errors, but this drives up the cost of such a unit.

Hence, reduction of cross scan errors of scanning mirrors is desired.

SUMMARY

In view of the preceding, herewith is provided an optical system comprising a scanning mirror having a reflective facet, and a plurality of optical elements defining a light beam path from a first location to a second location via plural facet reflections on the facet comprising a relay segment from one facet reflection to a next facet reflection.

Provision of a relay segment from one facet reflection to a next facet reflection on the facet provides for, in use and while directing light from a light source along a light beam path from the first location to the second location via plural facet reflections on a rotary reflective facet of a scanning mirror, relaying the one facet reflection to the next facet reflection, therewith inverting angles of the beam from the one facet reflection onto the next facet reflection. Hence, reflection angle errors can be negated. This allows prevention or at least reduction of position errors at the second location due to reflection errors by (rotation of) the facet. By the relaying, optical properties of the light beam may be otherwise unaffected.

Thus, illumination of a target on the second position by light from the first position may be well controlled. The illumination may be used for one or more of illuminating, writing on, printing on, cutting, welding, melting, curing, etc. at least part of the target; the target may be or comprise an object and/or one or more flowable substances, such as light-curable substances for additive manufacturing. The illumination may comprise causing the target to radiate light at another wavelength than light of the light beam, in particular by fluorescence and/or phosphorescence. Also or alternatively, another optical effect may be produced such as reflection and/or emission of light at another polarization than the incident light.

The next facet reflection may preferably be a directly next facet reflection on the facet without another facet reflection in between so that no further/or other tracking error is accumulated.

The scanning mirror may comprise a rotary polygon mirror having plural reflective facets and the one facet reflection and the next facet reflection may be on the same facet. Thus, cross scan error can be reduced or prevented per facet and from one facet to the next reducing dynamic scan error of the polygon as a whole.

The one facet reflection and the next facet reflection may be at the same location, e.g. overlapping partly or fully on the facet. This may one or more of simplify alignment, assist alignment checking, minimise (introduction of) other errors, reduce size of the system.

The scanning mirror may be a first scanning mirror and the optical system may comprise a second scanning mirror having a reflective facet between the first scanning mirror and the second location, the scanning mirror may then be arranged for scanning in a different direction to the first scanning mirror, preferably perpendicular direction. Thus, scanning of a surface area other than a line scan may be facilitated, this may assist (use of the system for) confocal microscopy of a sample wider than a scan line. perpendicular scanning may assist e.g. one or more of improve resolution, reduce errors, reduce scanning time, facilitate alignment, alignment checking.

The system may further comprise a plurality of optical elements defining a further relay segment from a facet reflection on the first scanning mirror to a facet reflection on the second scanning mirror. Like in the above, this may allow prevention of cross-scan errors and improve scanning quality. The system may in particular be useful in confocal microscopy wherein the second scanning mirror may be used for reflecting scanning light and target light in opposite directions. Then, also image quality of the target may be improved.

The system may comprise a detector and/or an aperture; and it may then also comprise a beam splitter such as a dichroic mirror and/or a polarising beam splitter for directing, e.g. reflecting, light of a light source having a first optical property, e.g. having a first wavelength and/or a first polarisation, along the light beam path from the first location to the second location and differently directing, e.g. transmitting, light having a second optical property, e.g. having a second wavelength and/or second polarisation, along the light beam path and via the beam splitter to the detector and/or the aperture.

Such system may be used for scanned imaging, in particular confocal imaging, wherein light having the first optical property, e.g. of a first wavelength, may be used to illuminate at least part of the target and light having the second optical property, e.g. of a second wavelength, may be detected with the detector; the detector may be arranged behind the aperture which may be used for spatial filtering of the light having the second optical property and then be arranged at a focus of a lens.

Note that herein, unless otherwise specified, the word "lens" may relate to a single lens element or to a compound lens comprising multiple individual lens elements, e.g. an ocular, an achromat (such as an achromatic doublet), a collimated beam expander, etc.

An embodiment may comprise a detector and an aperture, possibly as described above, and it may comprise
  a beam splitter, e.g. a dichroic element such as a dichroic mirror and/or a polarising beam splitter, for directing light of a light source having a first optical property, e.g. being at a first wavelength and/or polarisation, from the first location to the second location and light having a second optical property, e.g. being at a second wavelength and/or polarisation, preferably from the second location, toward the detector through the aperture, and
  a second plurality of optical elements defining a second light beam path from the aperture to the detector via plural second facet reflections comprising a second relay segment from one second facet reflection to a next second facet reflection. Then, when the scanning mirror comprises a rotary polygon mirror having plural reflective facets, the one second facet reflection and the next second facet reflection may be on a same facet of the rotary polygon mirror, preferably on the same facet as the one facet reflection and the next facet reflection as specified before.

Such system allows for rescanning confocal microscopy. The light beam path and any further elements and aspects referred to above may then relate to the scanning path and the rescanning path. The next second facet reflection may preferably be a directly next second facet reflection on the facet.

Such embodiment may comprise a third scanning mirror having a reflective facet scanning a direction perpendicular to the first scanning mirror between the scanning mirror and the detector, in particular in a parallel direction to the second scanning mirror if present.

Then such system may further comprise a plurality of optical elements defining a second further relay beam path segment from the first scanning mirror to the third scanning mirror.

One or more of the second light beam path, the second relay segment, the second plurality of optical elements, the third scanning mirror, the second further relay beam path segment, etc. may provide any features and/or any benefits as set out for any one of the (first) light beam path, the second scanning mirror, the (first and/or further) relay segment, the (first) plurality of optical elements, etc. of any embodiment of the system discussed above, mutatis mutandis.

The system may comprise a light source for directing light along the light beam path from the first location to the second location and/or a target holder configured for holding a target at the second location. Such target holder may be configured hold a microscopy target at the second location, possibly comprising an objective lens system The facet reflections may be arranged on one side of the scanning mirror and the relay segment and/or, if applicable, the second relay segment, may then located at least in part on an opposite side of the scanning mirror, e.g. extending around the scanning mirror and preferably extending in a plane perpendicular to a scanning axis of the scanning mirror. This facilitates constructing the system in a comparably small space.

Associated with the foregoing, and providing associated benefits, a further aspect comprises an optical method.

The method comprises directing light from a light source along a light beam path from a first location to a second location via plural facet reflections on a rotary reflective facet of a scanning mirror, comprising relaying one facet reflection to a next facet reflection on the facet while rotating the facet.

Relaying the one facet reflection to a next facet reflection on the facet while rotating (a mirror head comprising) the facet allows reducing or preventing cross scan errors, as discussed herein elsewhere.

The scanning mirror may comprise a rotary polygon mirror having plural reflective facets and the one facet reflection and the next facet reflection are on the same facet.

Use of a polygon mirror facilitates providing even illumination of a scanned line on a target; a scanning mirror scanning forth and back tends to have a sinusoidal rotary velocity due to acceleration and deceleration of the mirror head oscillating about the scanning axis. Thus, illumination of a target via a facet reflection may result in locally varying average illumination power along the scanning line. A polygonal mirror facilitates scanning with a constant rotary velocity and therewith with a constant average illumination power along the scan line.

The one facet reflection and the next facet reflection may be at the same location.

The scanning mirror may be a first scanning mirror and the method may then comprise directing the light from the first scanning mirror to a second scanning mirror having a reflective facet and scanning with the second scanning mirror in a second direction perpendicular to a first scanning direction of the first scanning mirror between the first scanning mirror and the second location.

The method may then comprise relaying a facet reflection on the first scanning mirror to a next facet reflection on the second scanning mirror.

The method may comprise comprising directing light of a light source having a first optical property, e.g. being at a first wavelength and/or a first polarisation, using a beam splitter such as a dichroic mirror and/or a polarising beam splitter and directing the directed light along the light beam path from the first location to the second location and transmitting light having a second optical property, e.g. being at a second wavelength and/or second polarisation, along the light beam path and through the dichroic mirror toward a detector and/or an aperture.

The method may comprise detecting the light of the second wavelength for detection of particular processes at least part of a target arranged at the second location, such as writing on, printing on, cutting, welding, melting, curing, etc. In particular, the method may be used for confocal microscopy. The aperture may be used for imaging and/or spatial filtering of (light of) the second wavelength.

The method may comprise directing light of a light source having a first optical property, e.g. having a first wavelength and/or first polarisation, via a beam splitter, e.g. a dichroic element such as a dichroic mirror, along the light beam path from the first location to the second location and directing light having a second optical property, e.g. having a second wavelength and/or second polarisation, along the light beam path and using the beam splitter toward a detector through an aperture, and directing light having the second optical property, e.g. having the second wavelength, from the aperture to the detector via plural second facet reflections on a rotary reflective facet of the scanning mirror comprising relaying one second facet reflection to a next second facet reflection while rotating the facet, wherein when the scanning mirror comprises a rotary polygon mirror having plural reflective facets the one second facet reflection and the next second facet reflection may be on a same facet of the rotary polygon mirror, preferably on the same facet as the one facet reflection and the next facet reflection in a method as set out above.

The scanning mirror may be a first scanning mirror and the method may comprise directing the light from the first scanning mirror to a third scanning mirror having a reflective facet and scanning with the third scanning mirror in a third scanning direction perpendicular to a first scanning direction of the first scanning mirror between the first scanning mirror and a detector, in particular the third scanning direction being parallel to the second scanning direction referred to above.

The method may comprise holding a target at the second location and illuminating a portion of the target with the light.

The target may comprise a microscopy sample, and the method may further comprise imaging at least part of the sample light with the detector if provided.

Thus, improvements in rescanning confocal imaging, in particular confocal microscopy may be achieved, not only in scanning and descanning light beam paths but also in a rescanning light beam path.

In the method, the relaying the one facet reflection to the next facet reflection may comprise directing the light from the one facet reflection to the next facet reflection on an opposite side of the scanning mirror, e.g. at least partly around the scanning mirror and preferably in a plane perpendicular to a scanning axis of the scanning mirror. Also or alternatively, if applicable, the relaying the one second facet reflection to the next second facet reflection may comprise directing the light from the one second facet reflection to the next second facet reflection on an opposite side of the scanning mirror, e.g. at least partly around the scanning mirror and preferably in a plane perpendicular to a scanning axis of the scanning mirror.

Thus, herein is provided an optical system comprising a scanning mirror having a reflective facet, in particular a polygon mirror having plural reflective facets;

one or more first optical elements defining a first beam path segment directed from a light source to a facet location of the scanning mirror, to provide a first facet reflection of light from the light source, providing once reflected light;

one or more second optical elements defining a second beam path segment from the facet location and back to the facet location, to provide a second facet reflection of light from the light source, providing twice reflected light;

one or more third optical elements defining a third beam path segment from the facet location towards a target location, to direct twice reflected light towards a target location;

wherein the one or more second optical elements comprise a relay optical system arranged to define the second beam path segment as a relay beam path from the first reflection to the second reflection.

The scanning mirror may be a polygon mirror having plural reflective facets. The facet location may be determined by at least part of the facet and/or by a location where a facet of a polygon mirror is or expected to be at a rotation of the polygon mirror for causing the facet reflection.

The third optical elements may comprise a second scanning mirror having a reflective facet, and the third optical elements may then optionally comprise a further relay optical system arranged to define part of the third beam path segment as a relay beam path from the facet location reflection to a facet reflection location on the second scanning mirror, to provide further reflected light from the twice reflected light, and to direct further reflected light to the target location.

The optical system may comprise a detector and/or an aperture. An aperture may have a fixed size or an adjustable size; e.g. an adjustable diaphragm.

One or more of the first, second or third optical elements may comprise a beam splitter for directing, e.g. transmitting, light having a first optical property, e.g. having at a first wavelength and/or a first polarisation, along the respective one of the first, second and third light beam path segments in one direction and differently directing, e.g. reflecting, light having a second optical property, e.g. having at a second wavelength and/or second polarisation, along the respective one of the first, second and third light beam path segments in another direction.

The optical system may comprise one or more fourth optical elements defining a fourth beam path segment directed from the aperture to a second facet location of the scanning mirror possibly the same as the (first) facet location), to provide a third facet reflection, providing thrice reflected light;

one or more fifth optical elements defining a fifth beam path segment from the facet location and back to the facet location, to provide a fourth facet reflection, providing fourfold reflected light;

one or more sixth optical elements defining a sixth beam path segment from the fourth facet location towards a second target location, in particular a detector location, to direct fourfold reflected light towards the second target location;

wherein the one or more fifth optical elements comprise a relay optical system arranged to define the fifth beam path as a relay beam path from the third facet reflection to the fourth facet reflection.

The sixth optical elements may comprise a third scanning mirror having a reflective facet, and may optionally comprise a second further relay optical system arranged to define part of the sixth beam path segment as a relay beam path from the fourth facet location reflection to a facet reflection location on the third scanning mirror, to provide second further reflected light from the fourfold reflected light, and to direct second further reflected light to the second target location.

BRIEF DESCRIPTION OF THE DRAWINGS

The above-described aspects will hereafter be more explained with further details and benefits with reference to the drawings showing a number of embodiments by way of example.

DETAILED DESCRIPTION OF EMBODIMENTS

Figures 1, 2:
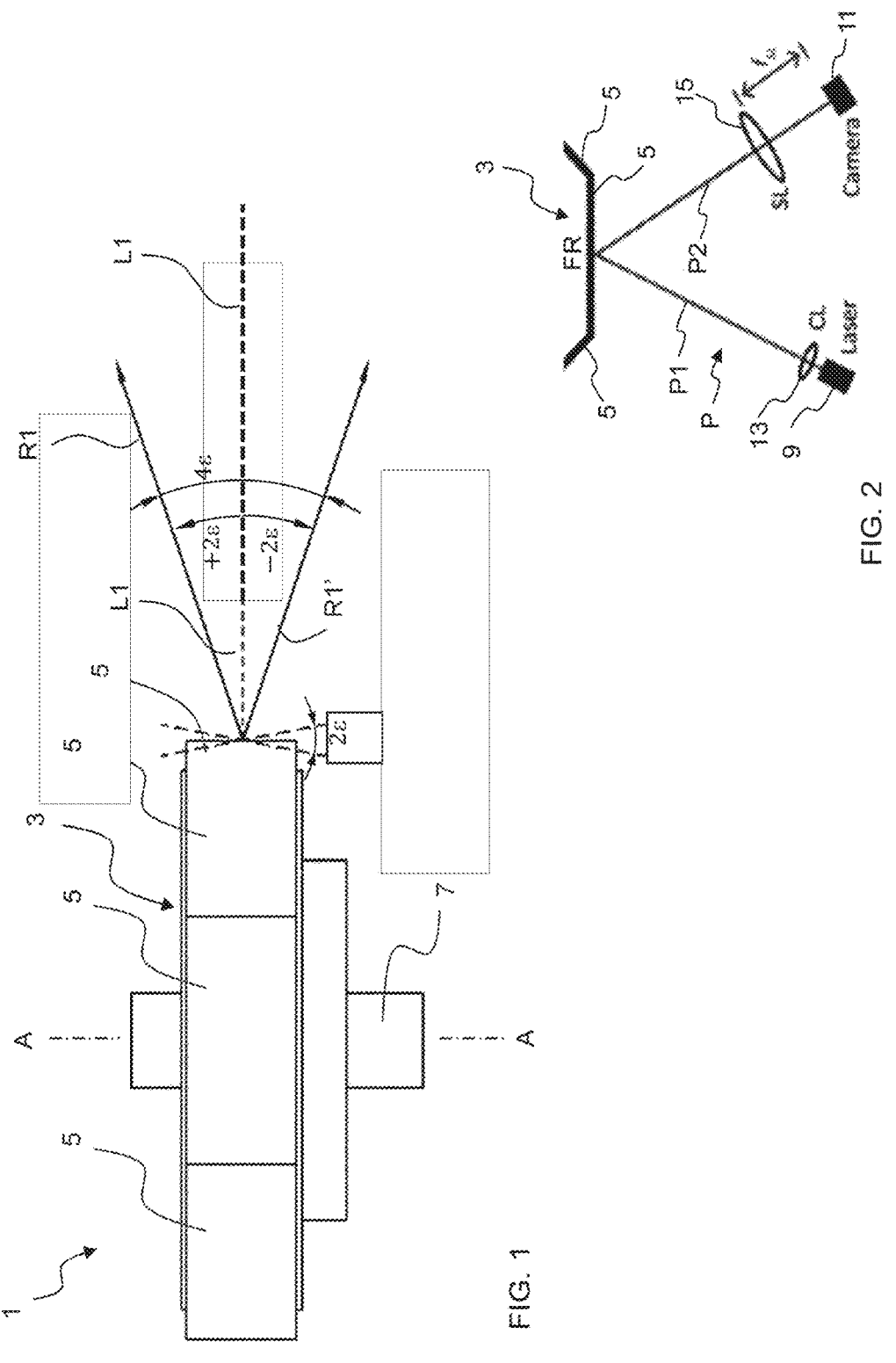
FIG. 1 shows a polygon mirror and some basic concepts.
FIG. 2 shows a use of a polygon mirror.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with alphabetic suffixes.

Further, unless otherwise specified, terms like "detachable" and "removably connected" are intended to mean that respective parts may be disconnected essentially without damage or destruction of either part, e.g. excluding structures in which the parts are integral (e.g. welded or moulded as one piece), but including structures in which parts are attached by or as mated connectors, fasteners, releasable self-fastening features, etc. The verb "to facilitate" is intended to mean "to make easier and/or less complicated", rather than "to enable".

FIG. 1 shows a polygon mirror 1, as an exemplary scanning mirror, having a mirror head 3 provided with multiple mirror facets 5, e.g. eight facets 5, and attached to a shaft 7 rotated about its center axis A.

Each facet 5 is plane and has a facet normal. A light beam incident on a facet will be reflected on the facet; to distinguish from other reflections, herein "facet reflection" is used to denote a reflection on a reflective facet of the scanning mirror, e.g. a polygon mirror facet. Ideally, the facet normal of each facet 5 is radial and in a radial plane relative to the axis A.

FIG. 2 shows in view in axial direction along axis A (hereinafter also referred to a s "top view", whereas FIG. 1 is then a side view) of part of the polygon 3, a light source 9, here a laser, causing a light beam along a beam path P (light beam segments P1, P2) from the light source 9 to a camera 11 or other target, via a facet reflection FR on a facet 5 of the polygon mirror 3. In FIG. 2, the light bam path is further defined by lenses 13, 15 e.g. a collimator lens 13 and an imaging lens 15

Cross scan errors may be caused by the normal being misaligned relative to the ideal orientation by an elevation angle $\varepsilon$ or $-\varepsilon$ (up or down in FIG. 1; here the errors are indicated as being symmetric) associated with a mechanical angle of the facet plane relative to a purely tangential plane relative to the axis A, as indicated. A light beam L1 incident on a facet 5 in a radial direction will therefore be reflected as a reflected light beam R1 (R1) that is deviated from the radial plane at an angle $2\varepsilon$ ($-2\varepsilon$), as indicated.

Cross scan errors may be caused by wobble of the facet relative to an ideal and fixed axis orientation, and/or in case of a polygon mirror different orientations of facet normals for different facet of the polygon mirror. Dynamic track error of a polygon scanner as a whole may be defined as the total mechanical angular variation of the facets perpendicular to the scanning direction, according to Marshall and Stutz, referred to above. This is the peak-to-peak (P2P) mechanical variation, resulting in an optical variation of twice that.

Each passing facet thus has a certain angular optical 'zero-to-peak' (Z2P) error from the 'intended' facet normal. The cross scan error due to facet normal elevation axis error, in particular the Z2P error, can be inverted and descanned with the use of a relay optical system.

Figures 3, 4, 5:
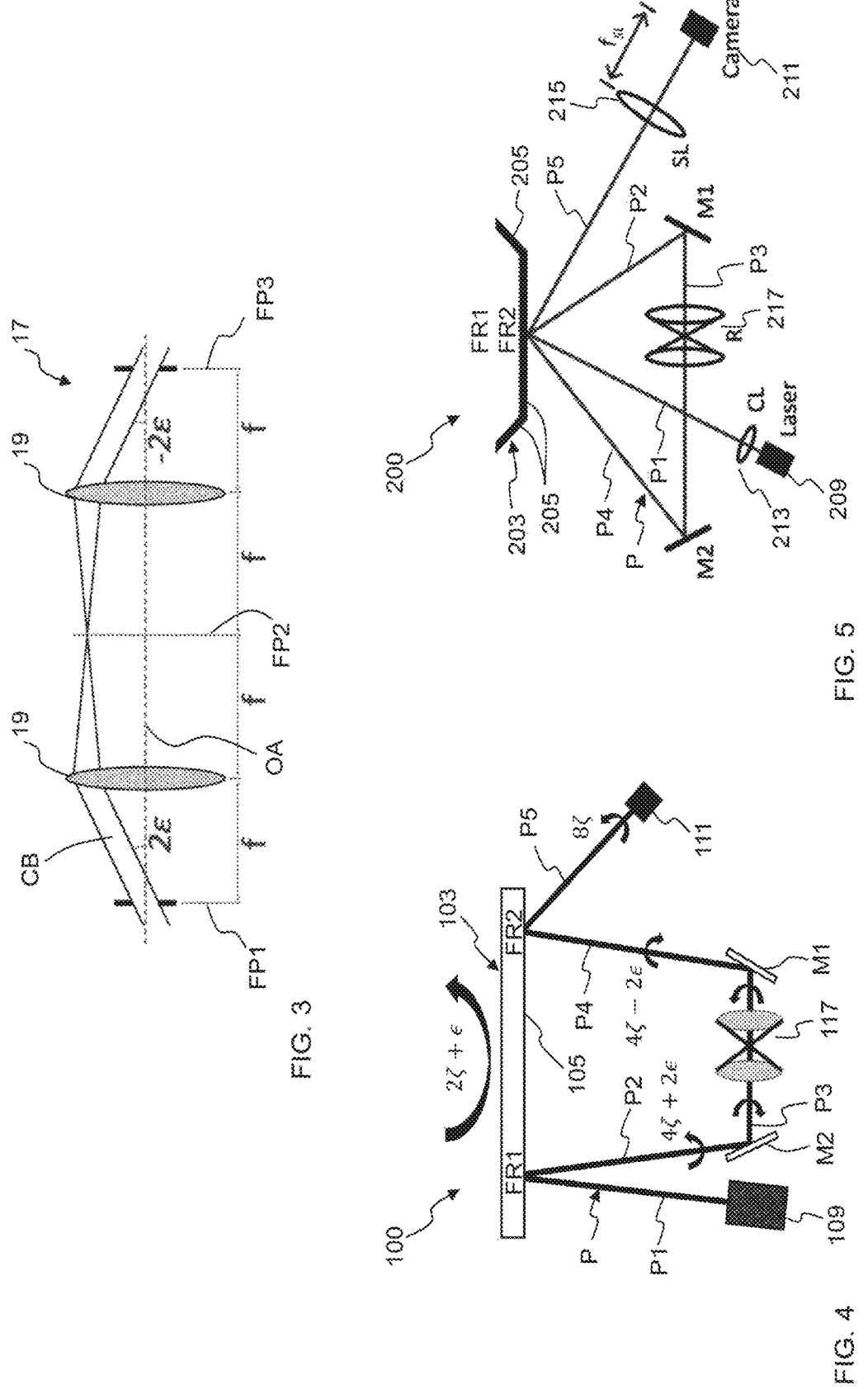
FIG. 3 indicates a relay system.
FIG. 4 indicates a first embodiment of an improved optical system.
FIG. 5 indicates a second embodiment of an improved optical system.

FIG. 3 indicates a relay optical system 17, (or: "relay system"/"relay optics" for short), which is known per se. E.g. it may comprise a set of two lenses 19 having front and back focal lengths f operably arranged with coincident focal points along an optical axis (not indicated) producing three focal planes FP1, FP2, FP3 along, and perpendicular to, the optical axis. The lenses 19 may or may not be identical, identical may be preferred. A collimated beam propagating along the optical axis will be focused in between the lenses 19 on the optical axis and after traversing the relay segment 19 propagate inverted about the optical axis (OA). As shown in FIG. 2, a collimated beam CB propagating at an angle $2\varepsilon$ to the optical axis will be focused in between the lenses 19 offset from the optical axis and after traversing the relay segment 19 propagate at an inverted angle relative to the optical axis. Thus the angle $2\varepsilon$ is relayed four focal lengths f along the optical axis with a sign change, to $-2\varepsilon$.

This angle is equal but negative at that point compared to the starting position. These two properties (the relaying, and sign inversion of any incoming angle) of a relay optical system can be used to eliminate the unwanted cross-scan error by simply relaying the beam scanned by a polygon facet back to the same polygon facet as also shown below. As explained with respect to FIG. 1 a light beam reflecting at a reflection location on a reflective facet 5 having an orientation error with respect to the optical axis, e.g. an elevation error $+\varepsilon$ will obtain an error in the direction of $+2\varepsilon$ with respect to the optical axis. If a first focal plane FP1 of the relay optical system 17 coincides with the reflection location, the beam will be focused in the second focal plane FP2 offset from the optical axis, and after traversing the relay optical system 17 the light beam will propagate at an inverted angle of −2ε with respect to the optical axis. If the third focal plane FP3 coincides with a reflection location a reflective facet 5 having an opposite elevation error −ε to the facet causing the initial reflection, the light beam is further reflected with the initial error negated so that the light beam then propagates again along the optical axis.

FIG. 4 indicates as a first embodiment an optical system 100. Note that to clarify the general structure of any Figure herein, each Figure is schematically and not to scale, with beam angles possibly being incorrect at reflections.

The optical system 100 comprises a scanning mirror 103 having a reflective facet 105, and a plurality of optical elements (e.g. static mirrors M1, M2) defining a light beam path P (having path segments P1-P5) from a light source 109 at a first location to a target 111 at a second location via plural facet reflections FR1, FR2 on the facet 105. The optical system 100 further comprises a relay optical system 117 providing a relay segment P2-P4 from one facet reflection FR1 to the next facet reflection FR2: the reflection locations of the facet reflections FR1, FR2 on the facet 105 are located at respective focal planes of the relay optical system 117.

As indicated with arrows, the scanning mirror 103 may rotate about a scanning axis (not indicated), causing associated rotations of the beam path segments. A scanning rotation of the facet 105 by a scanning angle 2ζ about the scanning axis, with a possible angular error ε, causes a doubling of the scanning deflection of the light beam segment with each facet reflection FR1, FR2 whereas the angular error ε is removed due to the relay segment P2-P4.

FIG. 5 indicates as a second embodiment an optical system 200 comprising a rotary polygon mirror 203 as a scanning mirror having reflective facets 205, and a plurality of optical elements (e.g. mirrors M1, M2) defining a light beam path P (having path segments P1-P5) from a laser as a light source 209 at a first location to a camera 211 at a second location via plural facet reflections FR1, FR2 on the facet 205 along the light beam path P. Different from FIG. 4, here the facet reflections FR1, FR2 are at the same location on the facet. The optical system 200 further comprises a relay system 217 providing a relay segment (P2-P4) from one facet reflection FR1 to the next facet reflection FR2: the reflection locations of the facet reflections R1, R2 on the facet 205 are located at respective focal planes of the relay system 217. Note that the relay segment (P2-P4) is, as an option, crossed by at last one other beam segment, here beam path segment P1. This facilitates a compact construction.

Figure 6B:
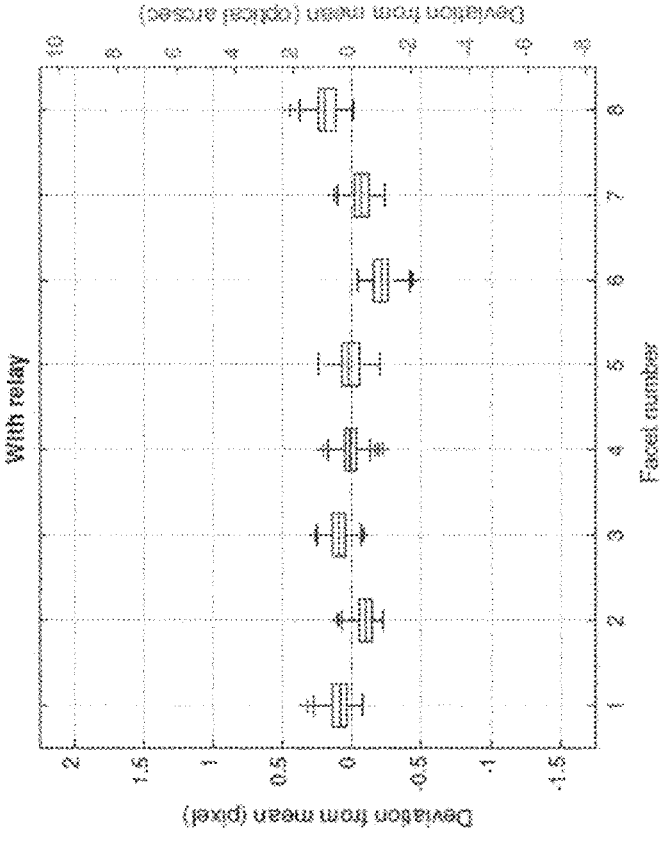
FIG. 6B shows cross scan error measurement results of the embodiment of FIG. 5.
Figure 6A:
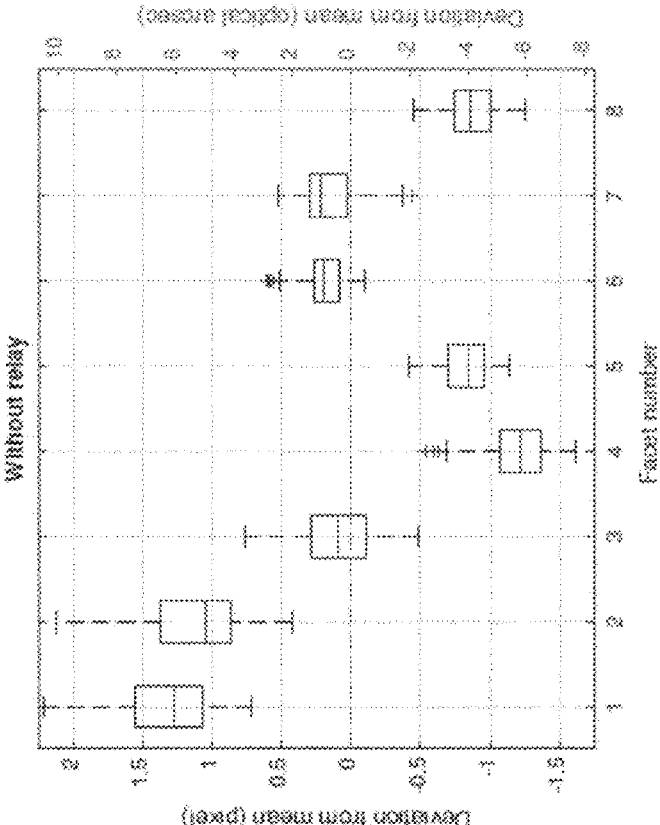
FIG. 6A shows cross scan error measurement results of the system of FIG. 3 as comparative example.

To test the effectiveness of the proposed method the setups of FIGS. 2 and 5 were compared using an eight-sided rotary polygon scanner. For each facet, a collimated beam was reflected off the polygon facet and either directly measured (FIG. 2) or first relayed back to that same polygon facet (FIG. 5). The light beam (finally) reflected off of the polygon was focused onto an image plane of the camera and the locations of the thus formed focus spots were determined. FIGS. 6A, 6B show as measurement results deviations of the eight facets from the mean trend lines of the comparative example of FIG. 2 in FIG. 6A, and of the embodiment of FIG. 5 comprising a relay system in FIG. 6B. The relay system significantly reduces the cross-axis error.

Figure 7:
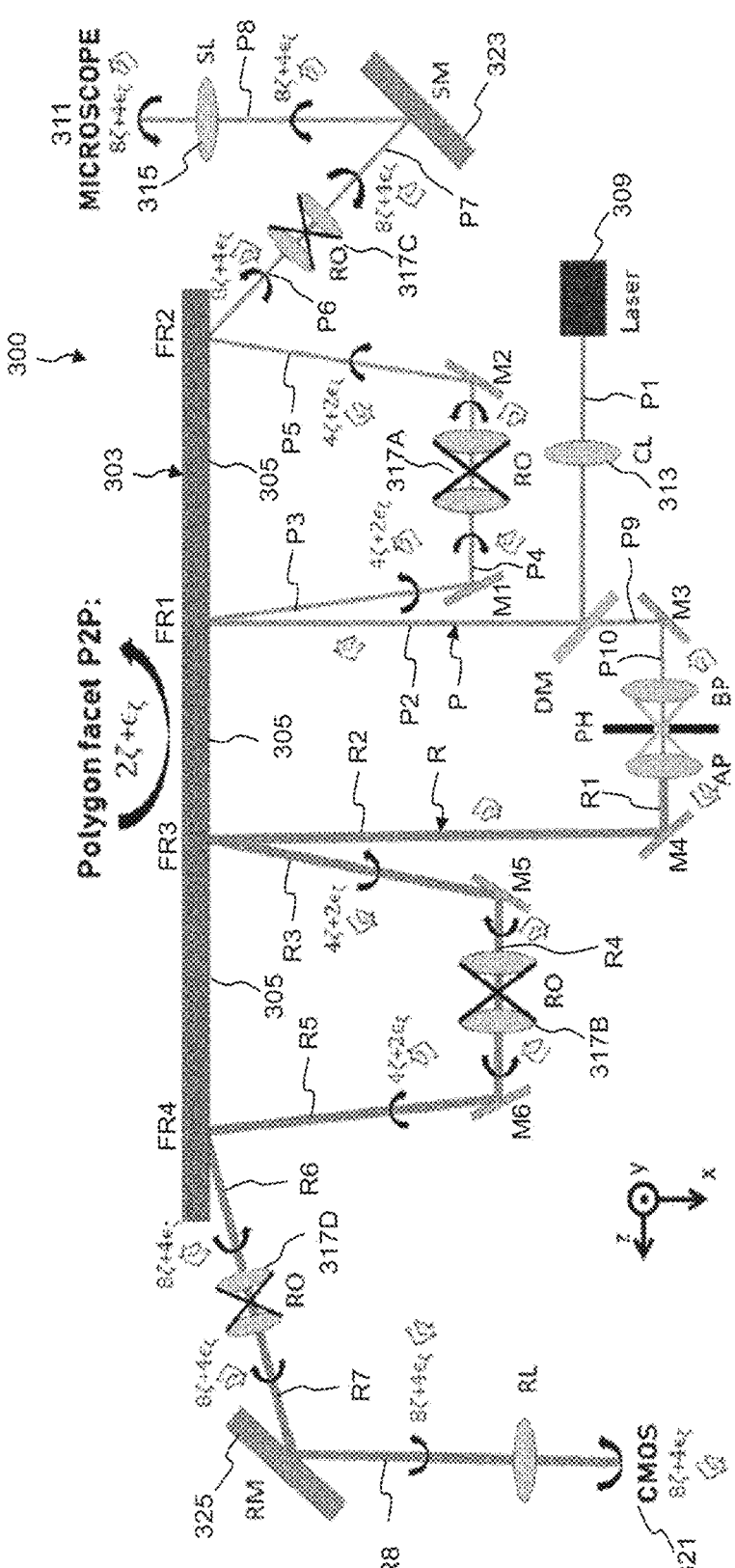
FIG. 7 indicates a third embodiment of an improved optical system.

FIG. 7 schematically shows an optical system 300 for rescanning confocal microscopy according to the present concepts.

The system 300 comprises a rotary mirror 303 comprising a reflective facet 305. Here, the mirror 303 is a polygon mirror and the mirror 303, and hence the facet 305, is rotary in an X-Z plane about an axis in Y-direction.

A plurality of optical elements comprising a dichroic mirror DM define a light beam path P (having segments P1-P8) from a laser light source 309 to a microscope 311 along beam path segments P1-P8 via plural facet reflections FR1, FR2 on the facet 305 comprising a first relay segment 317A from one facet reflection to a next facet reflection on the facet.

The system 300 further comprises a dichroic mirror DM as a beam splitter, a pinhole PH as an aperture and a CMOS camera 321 as exemplary detector.

A second plurality of optical elements define a second light beam path R having segments R1-R8 from the aperture PH to the detector 321 via plural second facet reflections FR3, FR4 comprising a second relay segment 317B from one second facet reflection FR3 to the next second facet reflection FR4 on the same facet as facet reflections FR1, FR2.

In system 300, the scanning mirror 303 is a first scanning mirror. The optical system 300 comprises a second scanning mirror 323 having a reflective facet and being arranged along the light beam path P between the first scanning mirror 303 and the microscope 311. The second scanning mirror 323 is arranged for scanning the light along the light beam path P in a perpendicular direction to the first scanning mirror 303, being rotary about an axis in the X-Z plane. A plurality of optical elements 317C define a further relay segment P6-P7 from a facet reflection FR2 on the first scanning mirror 303 to a facet reflection on the second scanning mirror 323.

The optical system 300 also comprises a third scanning mirror 325 having a reflective facet and being arranged along the light beam path R between the first scanning mirror 303 and the detector 321. The third scanning mirror 325 is arranged for scanning the light along the light beam path R in a perpendicular direction to the first scanning mirror 303, being rotary about an axis in the X-Z plane. A plurality of optical elements 317D define a second further relay segment R6-R7 from a facet reflection FR4 on the first scanning mirror 303 to a facet reflection on the third scanning mirror 325.

The laser 309 provides light at a first wavelength along segments P1-P8 of the light beam path P along to a sample (not shown) in the microscope 311. Sample light emitted from the sample is collected and directed along the segments P8-P1 of the light beam path P in reverse direction; sample light at a second wavelength is transmitted through the dichroic mirror DM toward the aperture PH along beam path segments P9-P10. The pinhole PH is arranged between lenses BP, AP focused on the pinhole PH in a spatial filtering setup.

Sample light passing the pinhole PH is directed by the second plurality of optical elements along the second light beam path R (R1-R8) to the camera 321.

As explained before, a scanning rotation of the facet 305 by a scanning angle 2ζ about the scanning axis (not shown) as indicated by the arrow, with a possible variation ε₍, causes an associated scanning rotation, as indicated with the respective arrows, of the respective light beam segments P3-P7 to the second scanning mirror 323 and from there to a sample suitably arranged (e.g. in a focus of) the microscope 311. By scanning the second scanning mirror 323 (or: "second scanning/descanning mirror") in a perpendicular direction, the light beam is scanned in two directions (i.e.: 2D scanning) over the sample.

Conversely, emission light from the sample is descanned in both directions by both scanning mirrors 323, 303, on the reverse path to the pinhole PH. Thereafter, sample light passing the pinhole PH and being directed along the second light bam path R (R1-R8) to the camera 321 is also scanned over the image plane of the camera 321, by the scanning of the first mirror facet 305 and next in perpendicular direction by the third scanning mirror 325 or "second rescan mirror", just as explained for the scanning above.

The light beam path segments P2-P10-R1-R2 form a static path, all other path segments being dynamic upon rotation of the first mirror 303 and possibly the second and/or third scanning mirror 323, 325.

By the provision of relay optical systems 317A and 317C/relay segments P3-P5 and P6-P7, respectively, cross scan errors of the first mirror (facet) are negated onto the second mirror facet reflection and the second mirror may scan the sample. According to the present principles, a further plurality of optical elements could be provided transforming the shown light beam path P8 into a light beam path from the second scanning mirror 323 to the microscope 311 via plural facet reflections on a reflecting facet of the second scanning mirror 323 comprising a relay segment from one facet reflection to a next facet reflection on that reflecting facet, so as to reduce or remove cross scan error from the second scanning mirror 323. The same applies, mutatis mutandis, to the relay systems 317B and 317D/relay segments R3-R5 and R6-R7, respectively, and for (the light beam path R8 from) the third scanning mirror 325 and (to) the camera 321.

In FIG. 7, several horse heads are indicated; the horse heads illustrate a 'sample image' as seen if one were to look directly onto the incoming sample emission beam at that point along the light path. It is important that this horse head 'looks' in the same direction the (re) scan beam moves to. Note again that image is not to scale and the beam angles on the facets are also incorrect, purposefully so for sake of clarity.

Figure 8:
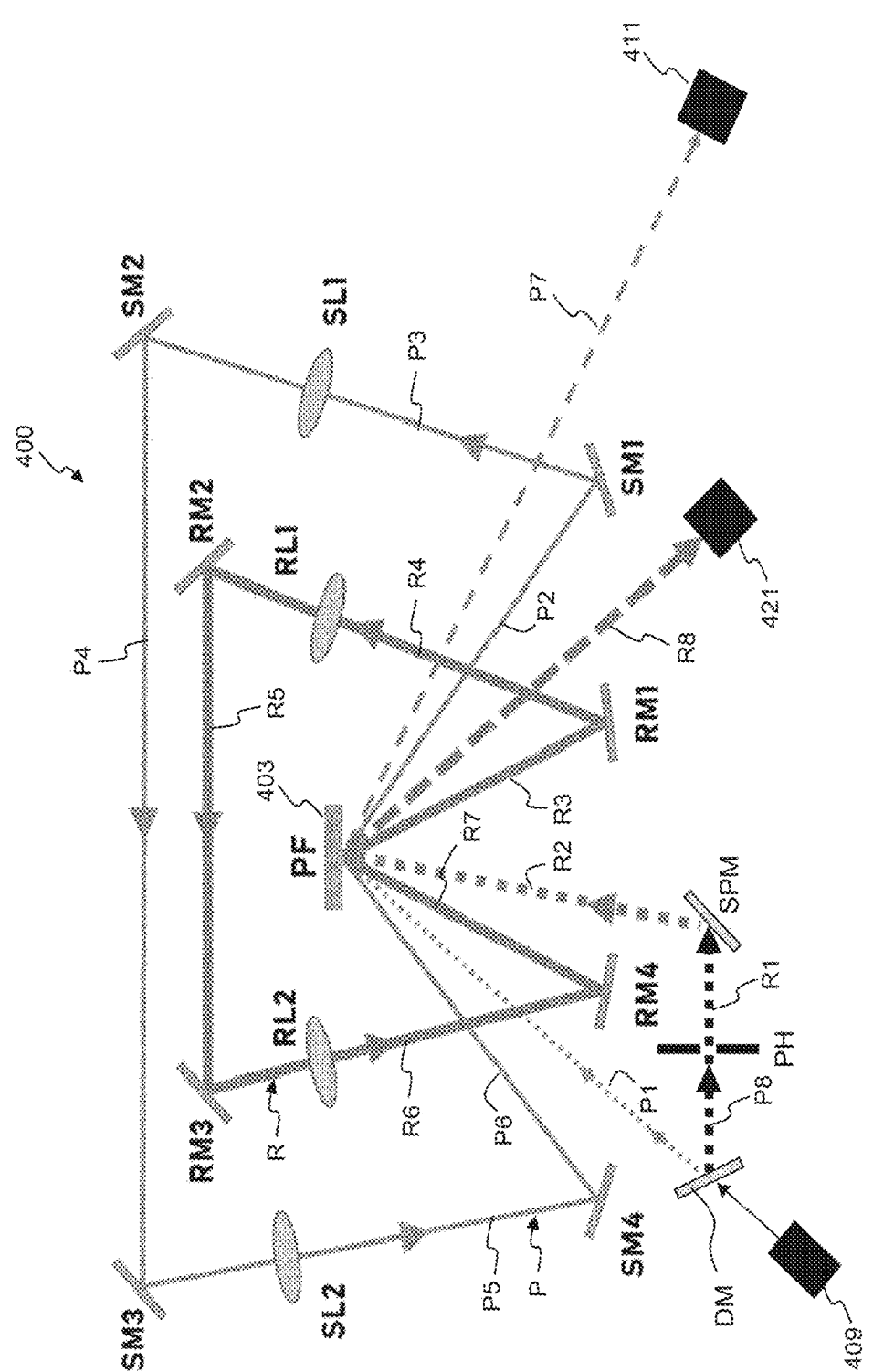
FIG. 8 indicates a fourth embodiment of an improved optical system.

FIG. 8 shows another optical system for rescanning confocal microscopy according to the present concepts.

The system 400 comprises a scanning mirror 403 comprising a reflective facet 405 rotary about a scanning axis perpendicular to the plane of the Figure; the mirror 403 may be a rotary polygon mirror. The system 400 comprises a dichroic mirror DM as a beam slitter, and a pinhole PH. FIG. 8 further shows a light source 409 for emitting excitation light at a first wavelength, a microscope 411, and a detector 321.

A plurality of optical elements and comprising the dichroic mirror DM, static mirrors SM1-SM4, and lenses SL1-SL2 define a light beam path P for the excitation light from the light source 409 to (a sample in) the microscope 411 along beam path segments P1-P7 via plural facet reflections PF on the facet 405, thus providing a scanning beam path. Note that in this embodiment the dichroic mirror transmits light of the light source 409.

The lenses SL1 and SL2 provide a relay optical system defining a first relay segment P2-P6 from one facet reflection PF to a next facet reflection PF on the facet in the light beam path P.

Similar to the system and explanation of FIG. 7, sample light from the sample at a second wavelength is directed along the light beam path P in reverse direction to the along segments P7-P1 and, after reflection by the dichroic mirror DM, P8 onto the pinhole PH, thus providing a descanning beam path.

Sample light passing the pinhole PH is directed by the second plurality of optical elements comprising static mirrors SPM, RM1-RM4, and lenses RL1, RL2, along a second light beam path R (having path segments R1-R8) defined by a second plurality of optical elements to the detector 321, thus forming a rescanning beam path. Lenses RL1 and RL2 provide a second relay system defining a second relay segment R3-R7 from one facet reflection PF to a next facet reflection PF on the facet in the light beam path R.

The path P1-P8-R1-R2 is a static path.

The relay segment P2-P6 and the second relay segment R3-R7, are located in part on an opposite side of the scanning mirror 403 from the reflection on the facet, extending around the scanning mirror 406 and, as an option, extending in a plane perpendicular to a scanning axis of the scanning mirror 403. The relay beam segments are, optionally, crossed by other beam path segments.

The disclosure is not restricted to the above-described embodiments which can be varied in a number of ways within the scope of the claims.

For instance elements and aspects discussed for or in relation with a particular embodiment may be suitably combined with elements and aspects of other embodiments, unless explicitly stated otherwise.

The invention claimed is:

1. An optical system comprising:
a rotary scanning mirror having a reflective facet,
a plurality of optical elements defining a light beam path from a first location to a second location via plural facet reflections on the reflective facet,
a relay segment from one facet reflection to a next facet reflection,
a detector,
an aperture,
a beam splitter configured to direct light of a light source having a first optical property from the first location to the second location and light having a second optical property along the light beam path and using the beam splitter toward the detector through the aperture,
a second plurality of optical elements defining a second light beam path from the aperture to the detector via plural second facet reflections comprising a second relay segment from one second facet reflection to a next second facet reflection, and
wherein the scanning mirror comprises a rotary polygon mirror having plural reflective facets, the one second facet reflection and the next second facet reflection are on a same facet of the rotary polygon mirror.

2. The optical system according to claim 1, wherein the scanning mirror comprises a rotary polygon mirror having plural reflective facets and the one facet reflection and the next facet reflection are on a same facet.

3. The optical system according to claim 1, wherein the one facet reflection and the next facet reflection are at a same location.

4. The optical system according to claim 1, wherein the scanning mirror is a first scanning mirror and the optical system comprises a second scanning mirror having a reflective facet between the first scanning mirror and the second location, the second scanning mirror arranged for scanning in a different direction to the first scanning mirror.

5. The optical system according to claim 4, and further comprising a second plurality of optical elements defining a further relay segment from a facet reflection on the first scanning mirror to a facet reflection on the second scanning mirror.

6. The optical system according to claim 4, and further comprising a third scanning mirror having a reflective facet scanning a direction perpendicular to the first scanning mirror between the first scanning mirror and the detector.

7. The optical system according to claim 6, and further comprising a second plurality of optical elements defining a second further relay beam path segment from the first scanning mirror to the third scanning mirror.

8. The optical system according to claim 1, and further comprising a detector and/or an aperture;

and a beam splitter configured to direct light of a light source having a first optical property along the light beam path from the first location to the second location and differently directing light having a second optical property along the light beam path and via the beam splitter to the detector and/or the aperture.

9. The optical system according to claim 1, and further comprising a light source for directing light along the light beam path from the first location to the second location.

10. The optical system according to claim 1, and further comprising a target holder configured for holding a target at the second location.

11. The optical system according to claim 10, wherein the target holder is configured to hold a microscopy target at the second location.

12. The optical system according to claim 1, wherein the facet reflections are arranged on one side of the scanning mirror and wherein the relay segment is located at least in part on an opposite side of the scanning mirror.

13. A method comprising:

directing light from a light source having a first optical property via a beam splitter along a light beam path from a first location to a second location via plural facet reflections on a rotary reflective facet of a scanning mirror, and relaying one facet reflection to a next facet reflection on the facet while rotating the rotary reflective facet, directing light having a second optical property along the light beam path and using the beam splitter toward a detector through an aperture, directing light having the second optical property from the aperture to the detector via plural second facet reflections on a rotary reflective facet of the scanning mirror comprising relaying one second facet reflection to a next second facet reflection while rotating the facet, and wherein the scanning mirror comprises a rotary polygon mirror having plural reflective facets the one second facet reflection and the next second facet reflection are on a same facet of the rotary polygon mirror.

14. The method according to claim 13, wherein the scanning mirror comprises a rotary polygon mirror having plural reflective facets and the one facet reflection and the next facet reflection are on a same facet.

15. The method according to claim 13, wherein the one facet reflection and the next facet reflection are at a same location.

16. The method according to claim 13, wherein the scanning mirror is a first scanning mirror and the method further comprises directing the light from the first scanning mirror to a second scanning mirror having a reflective facet and scanning with the second scanning mirror in a second direction perpendicular to a first scanning direction of the first scanning mirror between the first scanning mirror and the second location.

17. The method according to claim 16, and further comprising relaying a facet reflection on the first scanning mirror to a next facet reflection on the second scanning mirror.

18. The method according to claim 13, and further comprising directing light of a light source having a first optical property with a beam splitter and directing the directed light along the light beam path from the first location to the second location and differently directing light having a second optical property along the light beam path and through the beam splitter toward a detector and/or an aperture.

19. The method according to claim 13, wherein the scanning mirror is a first scanning mirror and the method further comprises directing the light from the first scanning mirror to a third scanning mirror having a reflective facet and scanning with the third scanning mirror in a third scanning direction perpendicular to a first scanning direction of the first scanning mirror between the first scanning mirror and a detector.

20. The method according to claim 19, and further comprising holding a target at the second location and illuminating a portion of the target with the light.

21. The method according to claim 20, wherein the target comprises a microscopy sample, the method further comprising imaging at least part of the microscopy light with the detector.

22. The method according to claim 13, wherein the relaying the one facet reflection to the next facet reflection comprises directing the light from the one facet reflection to the next facet reflection on an opposite side of the scanning mirror; and/or wherein the relaying the one second facet reflection to the next second facet reflection comprises directing the light from the one second facet reflection PF to the next second facet reflection on an opposite side of the scanning mirror.

\* \* \* \* \*